(12) United States Patent
Hoedt

(10) Patent No.: US 11,092,965 B2
(45) Date of Patent: Aug. 17, 2021

(54) METHOD AND DEVICE FOR DRIVING DYNAMICS CONTROL FOR A TRANSPORTATION VEHICLE

(71) Applicant: VOLKSWAGEN AKTIENGESELLSCHAFT, Wolfsburg (DE)

(72) Inventor: Jens Hoedt, Hannover (DE)

(73) Assignee: Volkswagen Aktiengesellschaft

( * ) Notice: Subject to any disclaimer, the term of this patent is extended or adjusted under 35 U.S.C. 154(b) by 258 days.

(21) Appl. No.: 16/340,105

(22) PCT Filed: Sep. 1, 2017

(86) PCT No.: PCT/EP2017/071967
§ 371 (c)(1),
(2) Date: Apr. 6, 2019

(87) PCT Pub. No.: WO2018/068944
PCT Pub. Date: Apr. 19, 2018

(65) Prior Publication Data
US 2020/0026296 A1    Jan. 23, 2020

(30) Foreign Application Priority Data

Oct. 10, 2016   (DE) .................. 10 2016 219 594.8

(51) Int. Cl.
*G05D 1/00* (2006.01)
*G05D 3/00* (2006.01)
(Continued)

(52) U.S. Cl.
CPC .......... *G05D 1/0212* (2013.01); *B60W 20/11* (2016.01); *B60W 50/06* (2013.01); *G05D 1/0061* (2013.01);
(Continued)

(58) Field of Classification Search
CPC ... G05D 1/0212; G05D 1/0061; B60W 20/11; B60W 50/06; B60W 2552/40;
(Continued)

(56) References Cited

U.S. PATENT DOCUMENTS

2003/0191568 A1* 10/2003 Breed .................. B60W 40/06
                                                                    701/36
2004/0209732 A1* 10/2004 Eguchi ............. F16H 61/66272
                                                                    477/44
(Continued)

FOREIGN PATENT DOCUMENTS

DE    102013016520 A1    4/2015
DE    102014203752 A1    9/2015
(Continued)

OTHER PUBLICATIONS

Search Report for International Patent Application No. PCT/EP2017/071967; dated Nov. 28, 2017.

*Primary Examiner* — B M M Hannan
(74) *Attorney, Agent, or Firm* — Barnes & Thornburg LLP

(57) ABSTRACT

A method for driving dynamics control for a transportation vehicle, wherein a manipulated variable of the driving dynamics is controlled by a control circuit having two degrees of freedom, consisting of a pilot control and a controller, to drive through a planned trajectory, wherein the control circuit has an iteratively learning controller which cyclically repeats classifying the planned trajectory by a classification device, retrieving a manipulated variable profile for the iteratively learning controller from a database based on the classification, recording a control fault of the control circuit and/or a manipulated variable of the controller when driving through the planned trajectory by a memory, and adapting the manipulated variable profile of the iteratively learning controller based on the recorded (Continued)

control fault and/or the recorded manipulated variable of the controller. Also disclosed is an associated device.

18 Claims, 5 Drawing Sheets

(51) Int. Cl.
  *G05D 1/02* (2020.01)
  *B60W 20/11* (2016.01)
  *B60W 50/06* (2006.01)
(52) U.S. Cl.
  CPC ..... *B60W 2530/10* (2013.01); *B60W 2552/40* (2020.02)
(58) Field of Classification Search
  CPC ..... B60W 2530/10; B60W 2050/0012; B60W 2050/0014; B60W 2050/0075; B60W 2050/0083; B60W 2050/0088; B60W 2050/0089; B60W 30/10; B60W 50/00; B60W 50/0098
  USPC .......................................... 701/1, 23, 25–26
  See application file for complete search history.

(56) References Cited

U.S. PATENT DOCUMENTS

| | | | |
|---|---|---|---|
| 2005/0060069 A1* | 3/2005 | Breed | B60N 2/2863 701/408 |
| 2008/0105475 A1* | 5/2008 | Hu | B60K 6/105 180/65.1 |
| 2014/0039716 A1* | 2/2014 | Buerkle | B62D 15/025 701/1 |
| 2015/0073663 A1* | 3/2015 | Nilsson | B60W 50/0098 701/41 |
| 2015/0081200 A1* | 3/2015 | Wang | G01C 21/00 701/301 |
| 2015/0166062 A1 | 6/2015 | Johnson et al. | |
| 2017/0010124 A1* | 1/2017 | Reisman | G01C 21/3602 |
| 2017/0133970 A1* | 5/2017 | Lee | H02P 29/024 |
| 2017/0168485 A1* | 6/2017 | Berntorp | G05D 1/0217 |
| 2017/0344855 A1* | 11/2017 | Mande | G06K 9/00785 |
| 2018/0017971 A1* | 1/2018 | Di Cairano | B60W 30/02 |

FOREIGN PATENT DOCUMENTS

| | | |
|---|---|---|
| DE | 102014208785 A1 | 11/2015 |
| EP | 2974943 A2 | 1/2016 |
| WO | 2014009216 A1 | 1/2014 |
| WO | 2014086463 A1 | 6/2014 |

* cited by examiner

US 11,092,965 B2

METHOD AND DEVICE FOR DRIVING DYNAMICS CONTROL FOR A TRANSPORTATION VEHICLE

PRIORITY CLAIM

This patent application is a U.S. National Phase of International Patent Application No. PCT/EP2017/071967, filed 1 Sep. 2017, which claims priority to German Patent Application No. 10 2016 219 594.8, filed 10 Oct. 2016, the disclosures of which are incorporated herein by reference in their entireties.

SUMMARY

Illustrative embodiments relate to a method and a device for driving dynamics control for a transportation vehicle.

BRIEF DESCRIPTION OF THE DRAWINGS

The disclosed embodiments are described in detail below with reference to the figures. In the figures.

DETAILED DESCRIPTION

Figure 1:
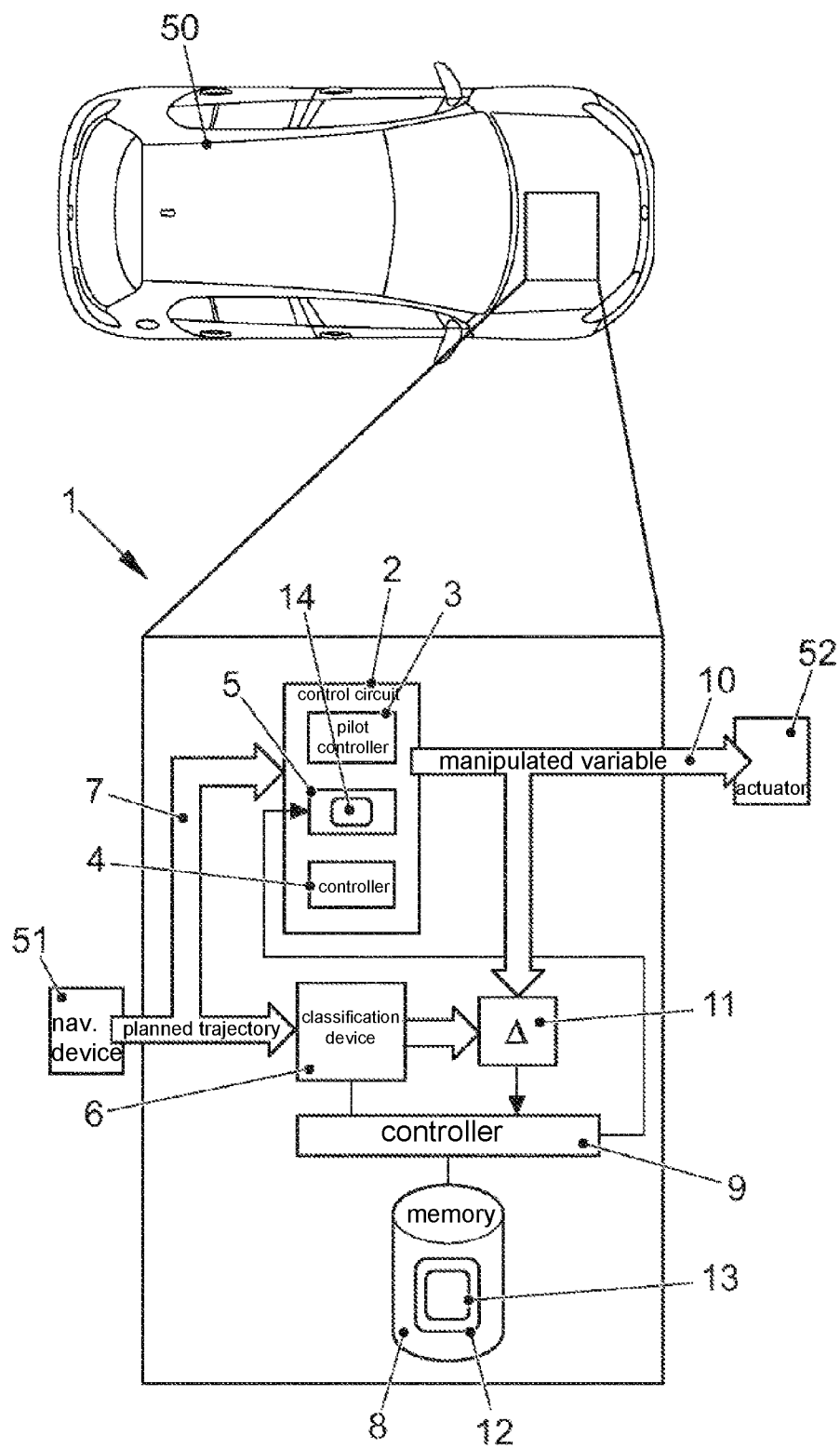
FIG. 1 shows a schematic representation of an embodiment of the device for driving dynamics control for a transportation vehicle.

Modern transportation vehicles comprise a number of assistance systems that support the driver when driving the transportation vehicle, such as, for example, distance assistants, parking assistants or lane keeping assistants. Increasingly, systems are also used that enable semi-automated or automated journeys of the transportation vehicle.

For controlling such a semi-automated or automated journey, control circuits for controlling the driving dynamics of the transportation vehicle can be used, with which a specified trajectory can be traversed in a controlled manner by controlling at least one manipulated variable using the specification. A driving dynamics controller of this type comprises a fixed model for the transportation vehicle and a fixed parameter set.

In reality however, the parameters of the model fluctuate and seldom agree exactly with the real current parameters. Moreover, the models consist of approximations and are thus inaccurate. So far, attempts have been made to improve driving dynamics control by estimating the parameters of the model with the greatest influence, such as, for example, a mass of the transportation vehicle or a coefficient of friction, by observers, Kalman filters, extended Kalman filters or unscented Kalman filters.

Disclosed embodiments provide a method and a device for driving dynamics control for a transportation vehicle with which the driving dynamics control is improved.

A method for driving dynamics control for a transportation vehicle is provided, whereby for traversing a planned trajectory a manipulated variable of the driving dynamics is controlled by a control circuit with two degrees of freedom, consisting of a pilot controller and a controller, whereby the control circuit additionally comprises an iteratively learning controller, comprising the following cyclically repeating operations: classifying the planned trajectory by a classifying device, calling up a manipulated variable profile for the iteratively learning controller from a database based on the classification, recording a control error of the control circuit and/or a manipulated variable of the controller by a memory when traversing the planned trajectory, and adjusting the manipulated variable profile of the iteratively learning controller based on the recorded control error and/or the recorded manipulated variable of the controller.

Furthermore, a device for driving dynamics control for a transportation vehicle is provided, comprising a control circuit with two degrees of freedom for controlling a manipulated variable of the driving dynamics for traversing a planned trajectory, consisting of a pilot controller and a controller, whereby the control circuit additionally comprises an iteratively learning controller, a classifying device for classifying the planned trajectory, whereby the control circuit is designed to call up a manipulated variable profile for the iteratively learning controller from a database based on the classification, a memory, whereby the memory is designed to record a control error of the control circuit and/or a manipulated variable of the controller when traversing the planned trajectory, and whereby the iteratively learning controller is further designed to adjust the manipulated variable profile based on the recorded control error and/or the recorded manipulated variable.

The classification of a planned trajectory is carried out based on characteristic properties of the planned trajectory. One such characteristic property can, for example, be a geometric property, for example, a certain curvature or a certain radius of curvature etc. Thus, a class describes a certain type of trajectory in abstract ways, without specific trajectory data having to be stored for the type. In this context, the term "cluster" is also used. Such a cluster combines objects, in this case trajectories, with similar properties. Classifying methods or mechanisms assigning a planned trajectory to a cluster, so that the terms class and cluster are used synonymously here.

Respective manipulated variable profiles for the classes or clusters are stored in a database for the iteratively learning controller. The respective manipulated variable profiles are called up according to the classification of a planned trajectory and are implemented accordingly by the iteratively learning controller when traversing the planned trajectory.

The core idea of the disclosed embodiments is to classify planned trajectories and to record a control error that occurs when traversing the planned trajectory and/or the manipulated variable of the controller and to adjust the iteratively learning controller or the manipulated variable profile of the corresponding associated class based on the control error and/or the recorded manipulated variable of the controller. Iteratively learning controllers are used in production technology with gripping robots, for example, whereby the same task is carried out repeatedly in the same time by the gripping robot there. In this case, the same cycle is thus run through repeatedly. Such an iteratively learning controller seeks to improve both the settling behavior and the dynamic behavior of the control circuit by adjusting or correcting the manipulated variable for future control while taking into account the control error occurring in the past. With reference to the aforementioned method and the aforementioned device, the classified trajectories or the corresponding classes each constitute such a cycle. For each classified trajectory or the corresponding class, the iteratively learning controller or the manipulated variable profile stored in the database for the corresponding class can thus be adjusted with each new pass through an accordingly classified planned trajectory and in this way can be optimized operation-by-operation.

The classification of the planned trajectory is intended to be carried out with current methods of artificial intelligence and machine learning. In this case, for example, artificial neural networks or a cluster analysis can be used.

The control error can be detected or determined with a suitably designed sensor arrangement, for example. For this purpose, for example, cameras and corresponding locating devices can be used that enable the transportation vehicle to be located in an environment.

It can however also be provided to carry out the method independently of a sensor arrangement based only on the control error and/or the manipulated variable of the controller.

It can be provided that the iteratively learning controller is adjusted only after traversing the entire planned trajectory. Furthermore, it can even also be provided that the iteratively learning controller is adjusted continuously, i.e., already while traversing the planned trajectory.

With at least one disclosed embodiment, it is provided that the classification is carried out based on route information of the planned trajectory. This can, for example, be the individual positions on the trajectory. Furthermore, a form of the trajectory can also be used for this to carry out a classification. Thus, for example, certain route profiles, such as turns with a certain radius of curvature etc., are used for classifying. If, for example, the planned trajectory is a parking process, with which it is intended to parallel park into a parking space in reverse, then it can be assumed therefrom that such a parking processes can be or has to be carried out almost identically in most cases. An associated class that represents the parking trajectory is then accordingly selected for this.

In a further disclosed embodiment it is provided that the classification is carried out based on an arc length of the planned trajectory in local coordinates. The planned trajectory is parametrized for this based on the arc length (or path length).

With a further disclosed embodiment it is further provided that the classification is carried out based on a positional derivative and/or a time derivative of the planned trajectory. This is beneficial if a control behavior for a planned trajectory also depends on a speed or an acceleration of the transportation vehicle. Moreover, this also permits a difference of trajectories in different classes when classifying, with which, for example, the distance is identical but a speed and/or an acceleration is different.

In a further disclosed embodiment it is provided that output data of the controller associated with the planned trajectory is used for classifying the planned trajectory. In this case, output data of the individual components of the control circuit (i.e., the pilot controller, the controller and the iteratively learning controller) can also be taken into account. This enables abstract features in the output data of the control circuit to also be used for classifying the planned trajectory.

Planned trajectories can also be classified or associated with clusters according to geometric properties of the trajectories. This is suitable for setting up static clusters before traversing the trajectories. The use of the output data of the controller or the iteratively learning controller for classifying or associating with the clusters is then suitable for modifying, re-sorting and refining in so-called soft clusters during runtime. The term "soft" means in this context that a planned trajectory can be associated with a plurality of classes or clusters. The ultimate selection of one of the associated classes or one of the associated clusters, for example, for calling up the associated manipulated variable profile for the iteratively learning controller, is then carried out based on further criteria.

In a further disclosed embodiment it is provided that classes formed by classifying according to geometric properties of the planned trajectories during runtime are refined and modified based on a similarity analysis of the associated manipulated variables of the controller.

With at least one disclosed embodiment it is provided that the classifying device produces a new class if the planned trajectory cannot be associated with one of the classes. This enables new classes or clusters for different properties of the trajectories to be added dynamically if the already existing classes or clusters do not include properties of the planned trajectory.

In a further disclosed embodiment it is provided that at least parts of the database are provided by a device within the transportation vehicle. The database can, for example, be provided by a controller that is suitably designed for this. The controller then provides manipulated variable profiles called up from the database corresponding to the individual classes or clusters for the iteratively learning controller.

Furthermore, it can be provided that at least parts of the database(s) are exchanged between different transportation vehicles or other devices, for example, central servers or proprietary services. In this way, the data can be shared between them.

In a further disclosed embodiment it is provided that a planned trajectory is divided into sub trajectories before the classification, whereby sub trajectories are each individually classified by the classifying device. This enables planned trajectories to be divided into shorter sections. Thus, for example, a planned trajectory consisting of a straight section and a connected curved section with a certain curvature can be divided into a planned trajectory containing only the straight section and a planned trajectory containing only the curved section. Then the parts can be individually classified. The benefit is that the classification can be improved by this.

In at least one disclosed embodiment it is provided that a sub trajectory comprises a path length of between 50 m and 500 m. It has been shown that such a path length produces good results when classifying the trajectories.

However, other path lengths can also be provided if the classification of the trajectories requires or enables this. Thus, for example, with very winding routes a finer segmentation of the planned trajectory can be necessary.

Parts of the device can be embodied individually or together as a combination of hardware and software, for example, as program code that is executed in a microcontroller or microprocessor. The classification of the planned trajectory can be implemented with software provided for this purpose.

FIG. 1 shows a schematic representation of a disclosed embodiment of a device 1 for driving dynamics control for a transportation vehicle 50. The device 1 comprises a control circuit 2, consisting of a pilot controller 3, a controller 4 and an iteratively learning controller 5, a classifying device 6, a memory 8 and a controller 9. A planned trajectory 7 is delivered to the control circuit 2. The planned trajectory 7 can be provided by a navigation device 51 of the transportation vehicle 50, for example. Based on the provided planned trajectory 7, the control circuit 2 controls a manipulated variable 10 of the driving dynamics of the transportation vehicle 50. For example, the manipulated variable 10 controls an actuator arrangement 52 of the transportation vehicle 50.

Before traversing the planned trajectory 7, the classifying device 6 classifies the planned trajectory 7 and calls up a manipulated variable profile 13 for the iteratively learning controller 5 from a provided database 12 based on the class (or cluster) that is found. The classification is carried out based on geometric properties of the planned trajectories, for example. A planned trajectory 7 can thus be determined only by an abstract property, for example, but one that is characteristic of the associated class of trajectories, for example, by a certain curvature or a certain radius of curvature, etc. Thus, a class describes a certain type of trajectory in abstract ways, without specific trajectory data having to be stored for the type.

The database 12 with manipulated parameter profiles 13 for the iteratively learning controller 5, which are associated with the individual classes of trajectories, can, for example, be provided from an external device outside the transportation vehicle 50 before applying the method and can be loaded into the memory 8 for this, for example, by an interface (not shown). In this way, an exchange of the database 12 or even of parts of the database 12 with other transportation vehicles and/or services is also possible.

However, it can also be provided that the database 12 is produced in the transportation vehicle 50 itself and stored in the memory 8. This can be carried out by the classifying device 6 and the controller 9, for example. For this purpose, classifying the travelled trajectories, structuring the database 12 according to the classes and storing the manipulated variable profiles 13 for the iteratively learning controller 5 belonging to the classes in the database 12 in the memory 8 are carried out.

Following the classification of the planned trajectory 7, a control error 11 of the control circuit 2 and/or a manipulated variable of the controller 4 when traversing the planned trajectory 7 are recorded by the memory 8. Management of the memory 8 is carried out by the controller 9 in this case, whereby the controller 9 carries out all the memory operations.

Based on the recorded control error 11 or based on the recorded manipulated variable of the controller 4, the iteratively learning controller 5 of the control circuit 2 is adjusted. This means that a manipulated variable profile 13 of the iteratively learning controller 5 associated with the planned trajectory 7 is adjusted or modified and then updated in the database 12. In this case, it can be provided that the iteratively learning controller 5 is adjusted only after traversing the entire planned trajectory 7. It can however also be provided that the iteratively learning controller 5 is continuously adjusted while traversing the planned trajectory 7.

The benefit of the described device 1 is that planned trajectories 7 are classified and the associated manipulated variable profiles 13 of the iteratively learning controller 5 of the control circuit 2 can be individually adjusted for each class of trajectories. If the ambient conditions and/or the transportation vehicle parameters do not change during this, then a manipulated variable profile 13 of the iteratively learning controller 5 converges after multiple traversals of an associated type of trajectory. By contrast, if the ambient conditions and/or the transportation vehicle parameters do change, then the iteratively learning controller 5 self-adjusts dynamically to the changed ambient conditions and/or transportation vehicle parameters by modifying the corresponding manipulated variable profile 13.

Figure 2:
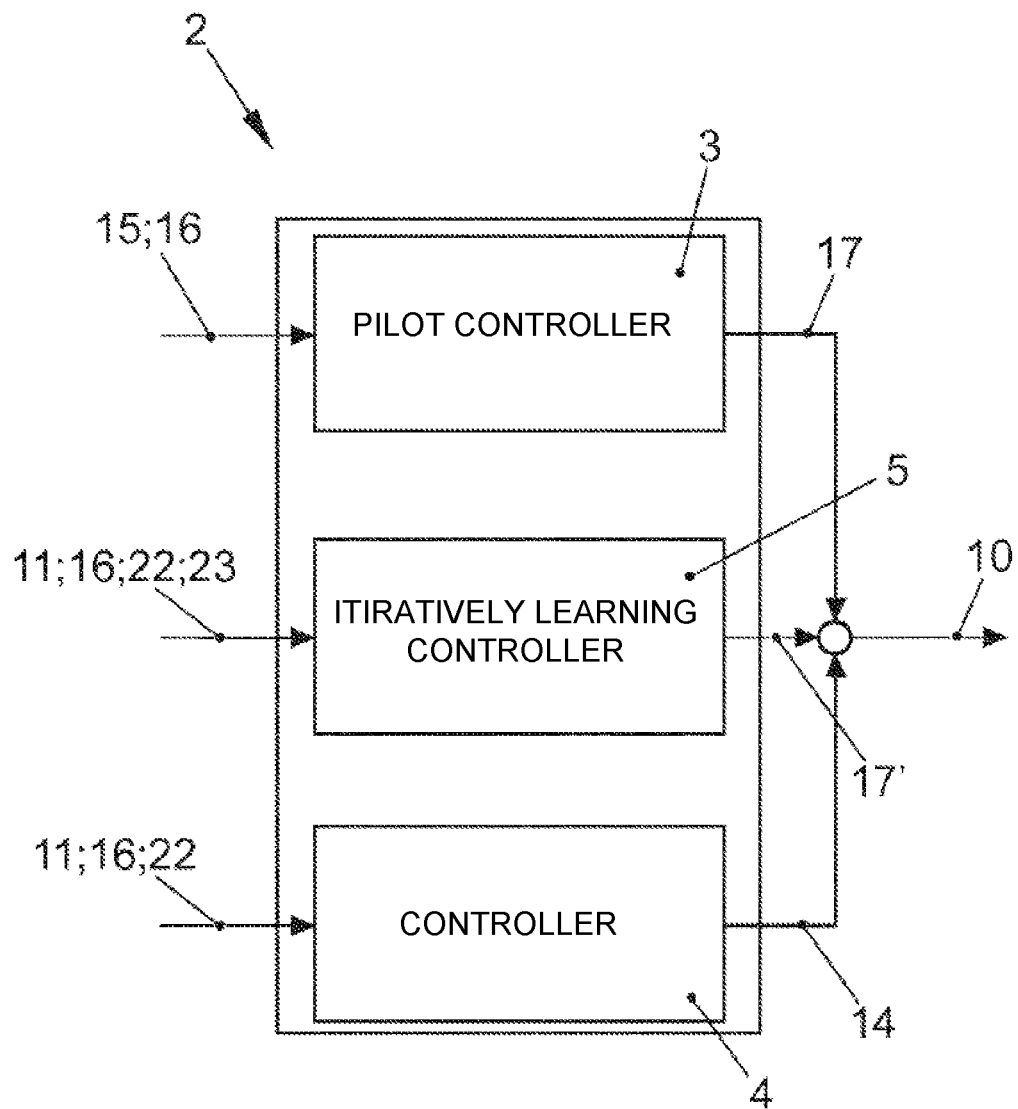
FIG. 2 shows a schematic representation of an embodiment of a control circuit with two degrees of freedom and an iteratively learning controller.

In FIG. 2, a schematic representation of a disclosed embodiment of the control circuit 2 with two degrees of freedom and the iteratively learning controller 5 is represented. The two degrees of freedom are provided by the pilot controller 3 and the controller 4. A control variable 15, which is derived from a planned trajectory, for example, is fed to the pilot controller 3. The control error 11 is fed to the controller 4. Time derivatives 22 can also be calculated and provided from the control error 11 itself. The control error 11 and the time derivatives 22 and/or positional derivatives 23 thereof are fed to the iteratively learning controller 5. The control variable 15 and the control error 11 are the input data 16 of the control circuit 2. The output data 17 of the pilot controller 3, the manipulated variable 14 of the controller 4 and the output data 17' of the iteratively learning controller 5 are summed and output as the manipulated variable 10. The manipulated variable 10 is then used for actuating an actuator arrangement of the transportation vehicle, for example.

While repeatedly traversing a planned trajectory 7 that pertains to a certain class of properties of trajectories, the iteratively learning controller 5 seeks to improve the dynamic behavior of the control circuit 2 by taking into account the control error 11 by adjusting or correcting the manipulated variable 10 for future control while taking into account the control error 11 that has occurred in the past. For each classified trajectory or the corresponding class of properties, the associated manipulated variable profile for the iteratively learning controller 5 can thus be adjusted with each new traversal of an accordingly classified planned trajectory, and in this way can be optimized operation-by-operation. Overall, the control behavior of the control circuit 2 is improved by this.

Figure 3:
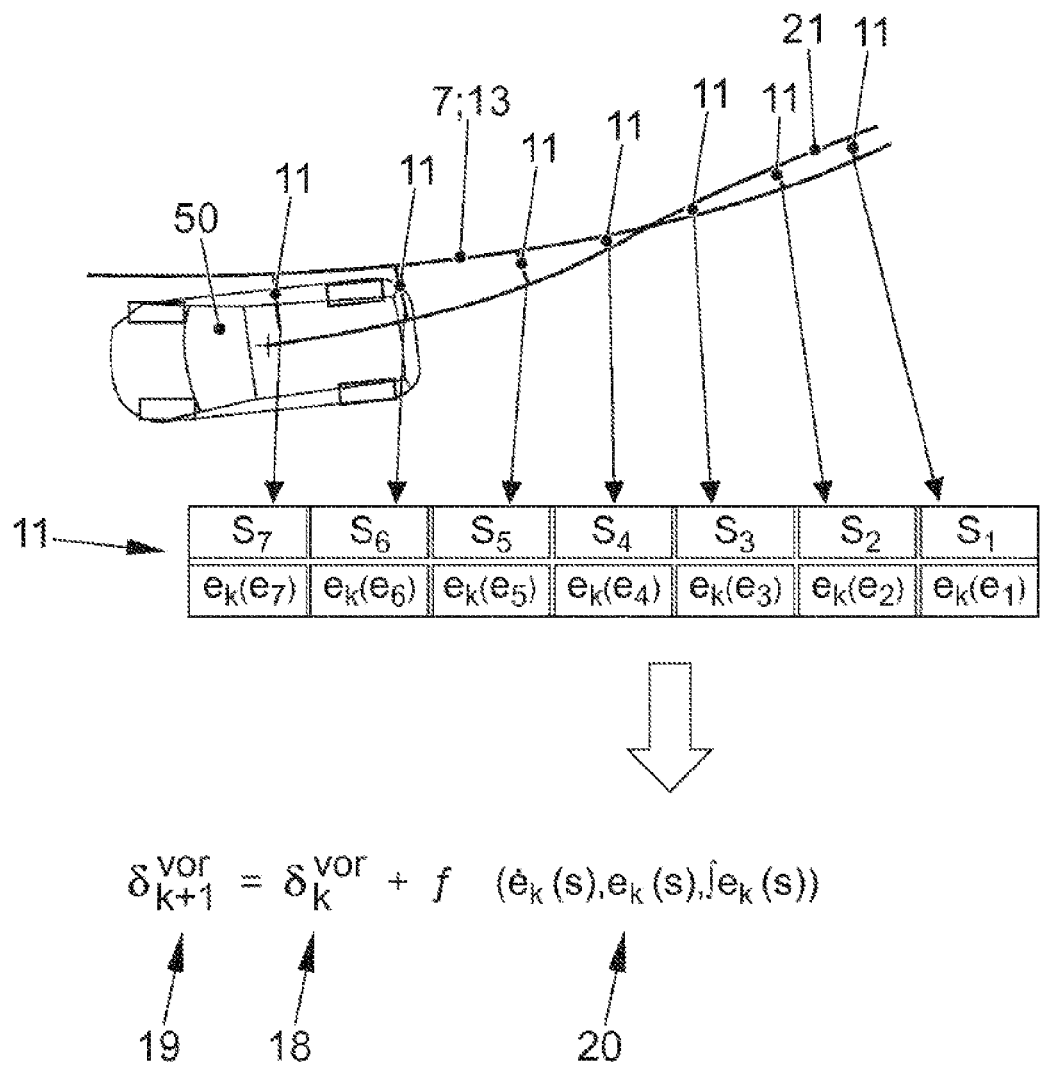
FIG. 3 shows a schematic representation for illustrating the control error.

In FIG. 3, a schematic representation for illustrating the control error 11 is represented. For a plurality of way points s1 through s7, in each case the control error 11 is represented as the difference between the planned trajectory 7 and the travelled trajectory 21. The values for the control error 11 are analyzed and taken into account by the iteratively learning controller 5 for adjusting an additive manipulated variable of the control circuit 2. This can, for example, be implemented in the context of a function that is provided for this purpose, which is dependent on the individual values of the control error 11. In this case, a correction value 18 is converted into a new correction value 19, for example, by the addition of a corresponding value of a function 20, whereby the value is derived from the control error 11. In this way, an adjustment of the correction value 18 applicable to the current cycle can be carried out for each new pass through a planned trajectory 7 or the associated stored trajectory 13.

Figure 4:
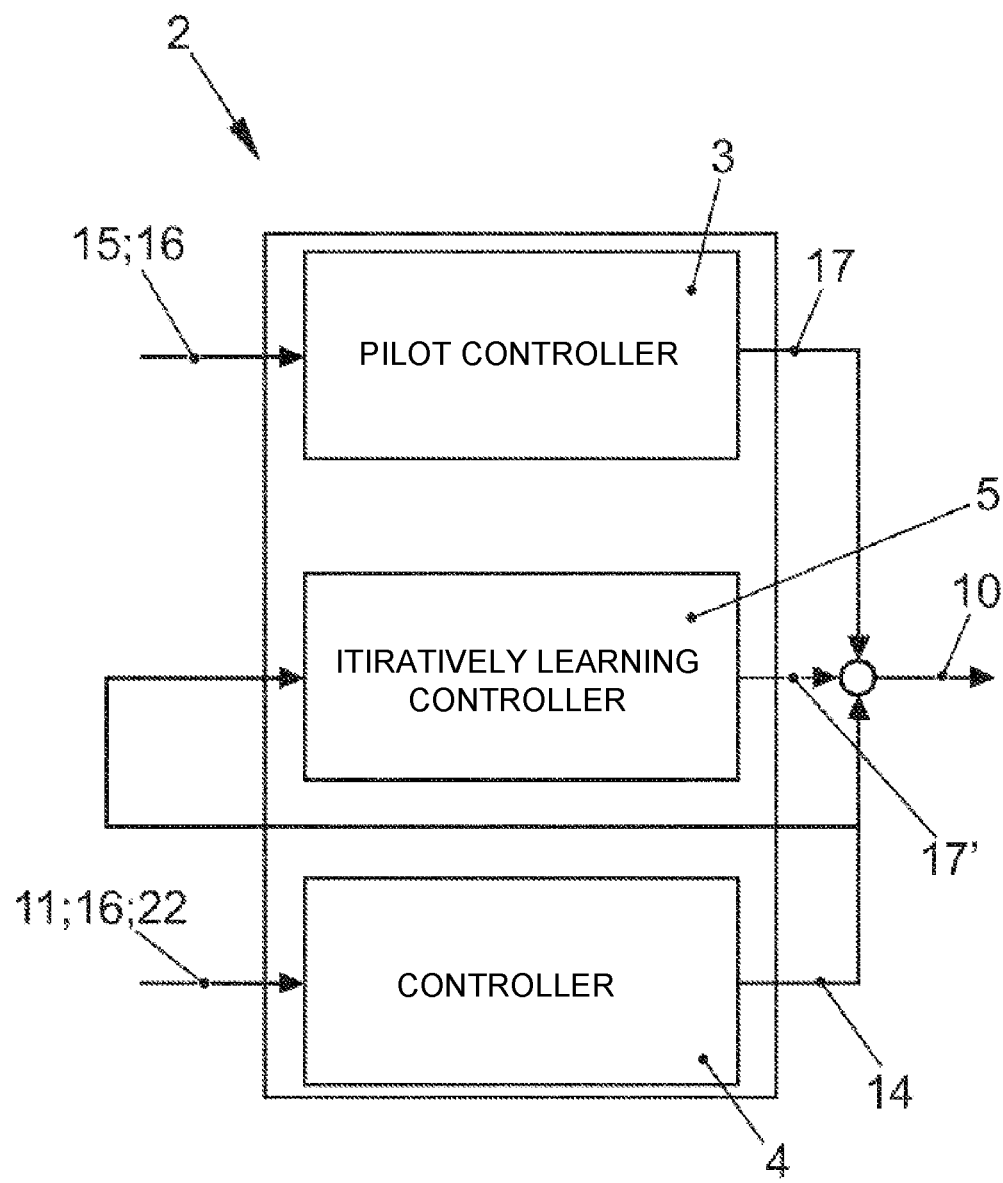
FIG. 4 shows a schematic representation of a further embodiment of a control circuit with two degrees of freedom and an iteratively learning controller.

In FIG. 4, a schematic representation of a further disclosed embodiment of a control circuit 2 with two degrees of freedom and an iteratively learning controller 5 is represented. Essentially, the disclosed embodiment is identical with the embodiments described in FIG. 2. The same reference characters denote the same terms or features here. The difference is, however, that the manipulated variables 14 of the controller 4 are used for adjusting the iteratively learning controller 5 or the corresponding manipulated variable profile.

Figure 5:
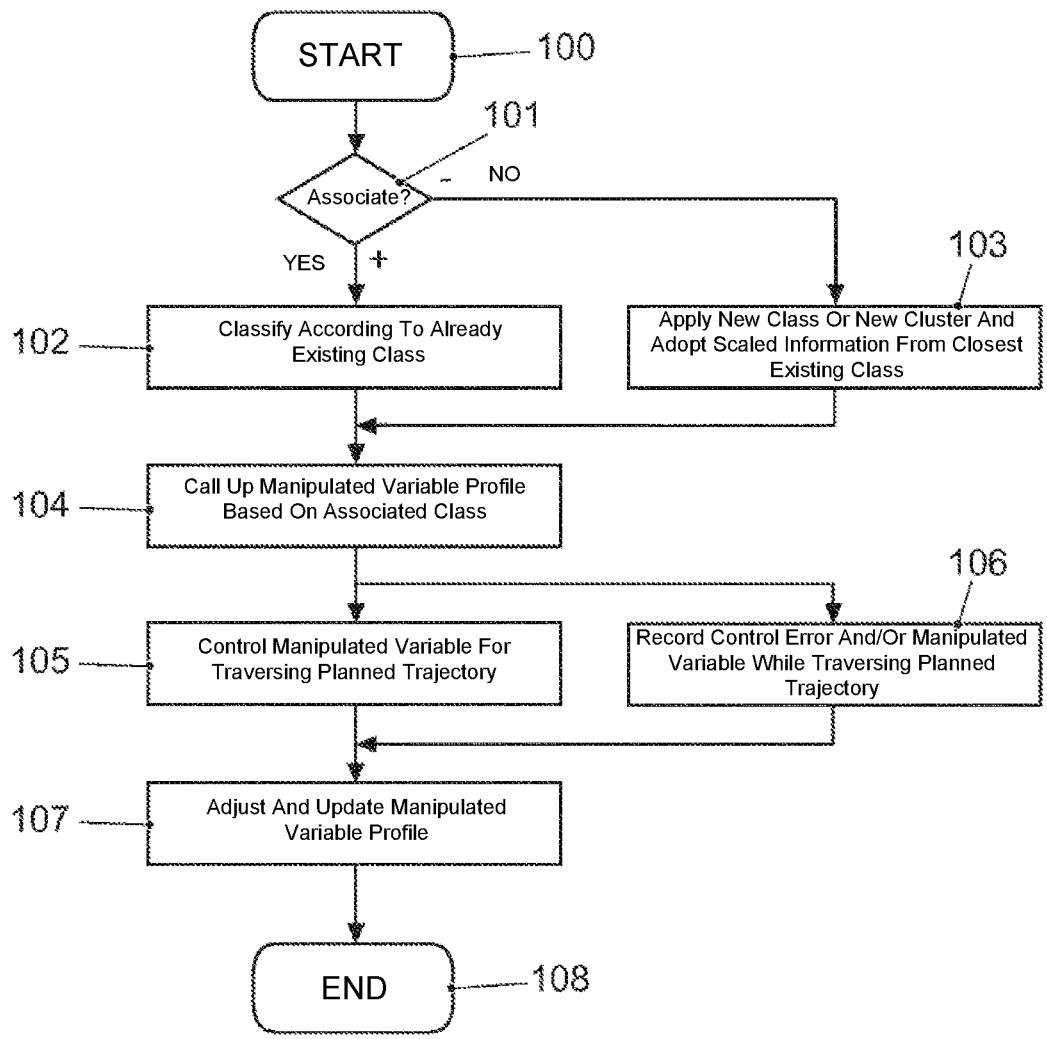
FIG. 5 shows a schematic flow chart of an embodiment of the method for driving dynamics control for a transportation vehicle.

In FIG. 5, a schematic flow chart of a disclosed embodiment of the method for driving dynamics control for a transportation vehicle is shown. Following the start 100 of the method, in a first operation at 101 of the method it is determined whether a planned trajectory can be associated with an already existing class.

If the planned trajectory can be associated with an already existing class, then the planned trajectory can be classified accordingly by a classifying device in the operation at 102 of the method.

If a planned trajectory is to be traversed that cannot be associated with an already existing class, then a new class or a new cluster is applied in the operation at 103 of the method by the classifying device and scaled information from a closest already existing class (cluster) is adopted (transfer learning).

The classification is carried out on the basis of geometric properties of the planned trajectory before traversing. During the journey, the classification properties of the cluster are further refined, altered and modified (not shown) using a similarity analysis of the manipulated variable of the controller.

Based on the selected class, in the operation at 104 of the method a manipulated variable profile for an iteratively learning controller of a control circuit is called up from a database, which it implements when traversing the planned trajectory. If a new class is produced in the operation at 103 of the method, then the corresponding manipulated variable profile of the closest already existing cluster is adopted.

In the subsequent operation at 105 of the method, a manipulated variable is controlled by the control circuit for traversing the planned trajectory.

In parallel thereto, in the operation at 106 of the method a control error and/or a manipulated variable of the controller is/are recorded by a memory when traversing the planned trajectory.

After traversing the planned trajectory and recording the control error in the memory, the manipulated variable profile for the iteratively learning controller is adjusted and updated accordingly in the database in the operation at 107 of the method based on the recorded control error and/or the recorded manipulated variable of the controller.

Then the method is ended 108 or can be re-started. It can be provided that the operations of the method 101 through 107 are cyclically repeated, so that the manipulated variable profiles of the iteratively learning controller are also cyclically adjusted. In the ideal case, a manipulated variable profile of this type converges after multiple traversals of a certain class of planned trajectories. By contrast, if the transportation vehicle parameters and/or the ambient conditions change, a dynamic adjustment of the manipulated variable profile to the corresponding class is carried out.

REFERENCE CHARACTER LIST 1 device
2 control circuit
3 pilot controller
4 controller
5 iteratively learning controller
6 classification device
7 planned trajectory
8 memory
9 controller
10 manipulated variable
11 control error
12 database
13 manipulated variable profile
14 manipulated variable of the controller
15 control variable
16 input data
17,17' output data
18 correction value
19 new correction value
20 function
21 traversed trajectory
22 time derivative
23 positional derivative
50 transportation vehicle
51 navigation device
52 actuator arrangement
100-108 operations of the method
s1-s7 way points

The invention claimed is:

1. A method for controlling driving dynamics of a transportation vehicle, the method comprising:
    determining, by a classifying device, that a planned trajectory of the transportation vehicle is corresponding to one of a plurality of classes of trajectories;
    calling up, for an iteratively learning controller and from a database, a manipulated variable profile corresponding to the one of the plurality of classes of trajectories, wherein the manipulated variable profile includes a manipulated variable for controlling an actuator arrangement of the transportation vehicle during traversing of the one of the plurality of classes of trajectories;
    controlling, by a control circuit during traversing of the planned trajectory, the actuator arrangement based the manipulated variable and a control variable derived from the planned trajectory;
    recording, by a memory during traversing of the planned trajectory, an error between the manipulated variable and the control variable; and
    adjusting, during traversing of the planned trajectory, the manipulated variable of the iteratively learning controller based on the error, wherein at least one instance of controlling the actuator arrangement during traversing of the planned trajectory is based on the manipulated variable adjusted during a present traversing of the planned trajectory.

2. The method of claim 1, wherein determining is based on an arc length of the planned trajectory in local coordinates.

3. The method of claim 1, wherein determining is based on a positional derivative and/or a time derivative of the planned trajectory.

4. The method of claim 1, wherein manipulated variables of the controller associated with the planned trajectory are used for classifying the planned trajectory.

5. The method of claim 1, wherein the classifying device is configured to generate a new class in response to the planned trajectory not being associated with any of the plurality of classes.

6. The method of claim 1, wherein at least parts of the database are provided by a device within the transportation vehicle.

7. The method of claim 1, further comprising, prior to determining, dividing the planned trajectory into sub-trajectories, wherein determining includes determining that each of the sub-trajectories is corresponding to one of a plurality of classes of sub-trajectories.

8. The method of claim 7, wherein one of the sub-trajectories comprises a path length of between 50 m and 500 m.

9. The method of claim 1, further comprising refining and modifying at least one of the classes based on a comparison between the manipulated variables of the controller.

10. A device for controlling driving dynamics of a transportation vehicle, the device comprising:
a control circuit configured to control the driving dynamics of the transportation vehicle during traversing of a planned trajectory, wherein the control circuit includes a pilot controller, a controller, an iteratively learning controller, and a classifying device, wherein the classifying device is configured to classify the planned trajectory as corresponding to one of a plurality of classes of trajectories, wherein the control circuit is configured to call up, for the iteratively learning controller and from a database, a manipulated variable profile corresponding to the one of the plurality of classes of trajectories, wherein the manipulated variable profile includes the manipulated variable for controlling an actuator arrangement of the transportation vehicle during traversing of the one of the plurality of classes of trajectories;
wherein the control circuit, during traversing of the planned trajectory, controls the actuator arrangement based the manipulated variable and a control variable derived from the planned trajectory; and
a memory configured to record during traversing of the planned trajectory, an error between the manipulated variable and the control variable,
wherein the iteratively learning controller adjusts the manipulated variable based on the error, and wherein, in at least one instance, the control circuit controls the actuator arrangement during traversing of the planned trajectory based on the manipulated variable adjusted during a present traversing of the planned trajectory.

11. The device of claim 10, wherein the classifying device is configured to classify the planned trajectory based on an arc length of the planned trajectory in local coordinates.

12. The device of claim 10, wherein the classifying device classifies the planned trajectory based on a positional derivative and/or a time derivative of the planned trajectory.

13. The device of claim 10, wherein the classifying device classifies the planned trajectory based on the manipulated variables associated with the planned trajectory.

14. The device of claim 10, wherein the classifying device produces a new class in response to the planned trajectory not being associated with any of the plurality of classes.

15. The device of claim 10, wherein at least parts of the database are provided by a device within the transportation vehicle.

16. The device of claim 10, wherein, prior to being classified, the planned trajectory is divided into sub-trajectories, and wherein the classifying device is configured to classify each of the sub-trajectories.

17. The device of claim 16, wherein one of the sub-trajectories comprises a path length of between 50 m and 500 m.

18. The device of claim 10, wherein the classes formed based on geometric properties of the planned trajectory during traversing of the planned trajectory are refined and modified based on a comparison to the manipulated variables of the controller.

* * * * *